United States Patent
Arai

(10) Patent No.: US 11,085,897 B2
(45) Date of Patent: Aug. 10, 2021

(54) MICROCHIP ELECTROPHORESIS APPARATUS

(71) Applicant: SHIMADZU CORPORATION, Kyoto (JP)

(72) Inventor: Akihiro Arai, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 246 days.

(21) Appl. No.: 16/130,011

(22) Filed: Sep. 13, 2018

(65) Prior Publication Data

US 2020/0088680 A1   Mar. 19, 2020

(51) Int. Cl.
  *G01N 27/447* (2006.01)
  *B08B 9/032* (2006.01)
  *B08B 3/04* (2006.01)

(52) U.S. Cl.
  CPC .... *G01N 27/44704* (2013.01); *G01N 27/44791* (2013.01); *B08B 3/04* (2013.01); *B08B 9/032* (2013.01)

(58) Field of Classification Search
  CPC ........ G01N 27/44704; G01N 27/44791; B08B 9/00; B08B 9/035; B08B 9/0325; B08B 9/0323; B08B 9/0321; B08B 3/04
  See application file for complete search history.

(56) References Cited

U.S. PATENT DOCUMENTS

| | | |
|---|---|---|
| 2005/0161402 A1 | 7/2005 | Hanafusa et al. |
| 2007/0175757 A1* | 8/2007 | Hanafusa ......... G01N 27/44791 204/451 |
| 2013/0153424 A1* | 6/2013 | Matsumoto ...... G01N 27/44743 204/604 |

FOREIGN PATENT DOCUMENTS

JP   4375031 B2   12/2009
JP   2017053726 A * 3/2017

OTHER PUBLICATIONS

English Machine Translation of JP2017053726 (Year: 2017).*

* cited by examiner

*Primary Examiner* — Gurpreet Kaur
(74) *Attorney, Agent, or Firm* — Sughrue Mion, PLLC

(57) ABSTRACT

It is an object to repeatedly use a microchip without complicating the structure of the microchip, as well as not impairing cost and operability. A seal-attached member 26 is disposed facing a microchip 5 held by a chip holding unit 7, and has through holes 64-3 and 64-4 provided at positions corresponding to reservoirs 53-3 and 53-4, respectively, and elastic members 67 that are pressed against the microchip 5 so as to maintain airtightness between the through holes 64-3 and 64-4 and the corresponding reservoirs 53-3 and 53-4. When the inside of a flow path 55 of the microchip 5 is cleaned, a dispensing probe 8 is inserted into the through hole 64-4 while airtightness between the through hole 64-4 and the dispensing probe 8 is maintained. Then, a suction nozzle 22-3 is inserted into the through hole 64-3. In this state, the dispensing probe 8 discharges a cleaning liquid to cause the cleaning liquid to flow from the reservoir 53-4 under the pressurizing port through hole 64-4 into the flow path 55, and the suction nozzle 22-3 sucks the cleaning liquid discharged from the flow path 55 to the reservoir 53-3.

7 Claims, 14 Drawing Sheets

(1) Probe cleaning (2) Feeding under pressure and suction of cleaning liquid (3) Suction of cleaning liquid in pressurizing port (4) Feeding under pressure of air and suction of cleaning LIQUID

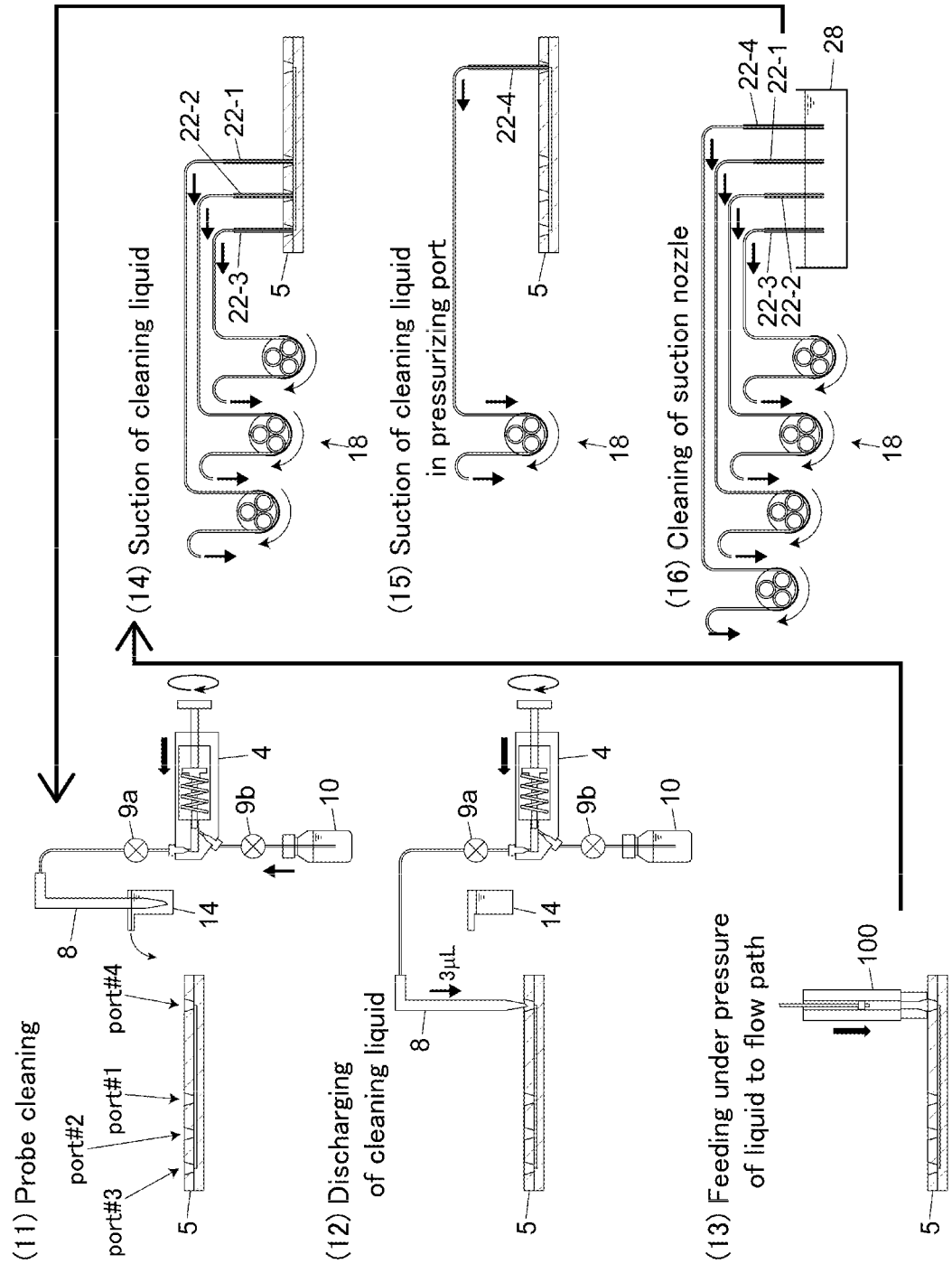

MICROCHIP ELECTROPHORESIS APPARATUS

TECHNICAL FIELD

The present invention relates to a microchip electrophoresis apparatus.

BACKGROUND ART

In microchip electrophoresis, a microchip for electrophoresis (hereinafter also referred to as an electrophoretic chip) having flow paths including a separation flow path inside a plate member is used. A sample such as DNA, RNA, protein, or the like introduced into the separation path of the electrophoresis chip is electrophoresed in the separation path when a voltage is applied between opposite ends of the separation path, thereby being separated and detected.

For example, the electrophoresis chip is formed by using a pair of plate members that are bonded to each other while a flow path faces inward. Usually, a reservoir formed of a through hole to be used as an access hole and a liquid reservoir is provided at a position corresponding to an end of the flow path. To the reservoir, dispensing of a reagent and a sample, pressure filling of a separation polymer (electrophoresis medium), and the like are performed from one surface side of the electrophoresis chip. Cleaning thoroughly the inside of the flow path and the reservoir after completion of analysis enables a plurality of samples to be analyzed using the same chip.

The reservoir has a capacity that is defined by a thickness and a hole diameter of each of the plate members. For example, the reservoir has a capacity of about 3 μL (micro liter) when having a thickness of 1 mm, and a hole diameter of 2 mm. Thus, cleaning treatment of the reservoir requires dispensing of 3 μL or less of cleaning liquid, a suction mechanism, and a pressurized liquid feeding mechanism to at least one place of the reservoir.

There is a microchip electrophoresis apparatus that performs electrophoresis fully automatically using an electrophoresis chip, and that includes a dispensing probe for supplying a solution such as a separation polymer or a sample to a reservoir, a pressurized liquid feeding mechanism that fills a flow path with the separation polymer supplied to the reservoir under pressure, a suction nozzle for sucking the separation polymer overflowing from the flow path to a reservoir side, and the like (refer to Patent Document 1).

PRIOR ART DOCUMENTS

Patent Documents

Patent Document 1: Japanese Patent No. 4375031

SUMMARY OF THE INVENTION

Problems to be Solved by the Invention

When a biopolymer such as a nucleic acid or a protein is separately detected using an electrophoresis chip, usually a buffer solution containing a water-soluble polymer is filled in the entire flow path network, and a sample is dispensed to at least one of a plurality of reservoirs formed at respective flow path ends to perform electrophoresis. After the electrophoresis is completed, the inside of each of the paths and the reservoirs of the electrophoresis chip are cleaned by repeating processes many times in the order below: (1) sucking and removing a buffer solution in each of the reservoirs; (2) dispensing a cleaning liquid to each of the reservoirs; (3) sucking and removing the cleaning liquid in each of the reservoirs; (4) dispensing the cleaning liquid to at least one of the reservoirs; (5) feeding the cleaning liquid under pressure; (6) sucking a used buffer solution to be discharged to other reservoirs; (7) cleaning inner and outer surfaces of the suction nozzle; and (8) cleaning the dispensing probe.

The discharge and suction of the cleaning liquid less than reservoir capacity are repeated, so that a loop count of the cleaning treatment increases. In addition, the loop count of the cleaning treatment tends to increase to eliminate a carry-over of a sample. This causes a problem that a long time is required for the cleaning treatment. In addition, when the cleaning liquid more than the reservoir capacity is discharged to overflow onto a chip surface, there is a problem that a short circuit occurs between reservoir electrodes. Even if there is no overflow, spray splashing on the chip surface during pumping of air causes a problem that a creepage distance gradually narrows to cause a short circuit. Both of the instances require the chip to be removed from the apparatus to clean the chip surface manually, thereby causing a problem that convenience of a full automatic is impaired.

It is an object of the present invention to repeatedly use a microchip without complicating the structure of the microchip, as well as not impairing cost and operability.

Solutions to the Problems

A microchip electrophoresis apparatus of an embodiment according to the present invention includes: a chip holding unit that holds a microchip provided its inside with not only flow paths including at least a separation flow path for separating a sample by electrophoresis, but also reservoirs opened at respective edges of the flow paths, so that the reservoirs face upward; a seal-attached member that is disposed facing the microchip held by the chip holding unit, and that has through holes at respective positions corresponding to the reservoirs, and an elastic member pressed against the microchip so as to maintain airtightness between the through holes and the corresponding reservoirs; a dispensing probe mechanism that is provided with a dispensing probe, and that moves the dispensing probe and discharges fluid from the dispensing probe; a suction nozzle mechanism that is provided with a suction nozzle, and that moves the suction nozzle and allows the suction nozzle to suck fluid; and a control unit that controls operation of the dispensing probe mechanism and the suction nozzle mechanism.

Effects of the Invention

The microchip electrophoresis apparatus of the embodiment according to the present invention enables an electrophoresis chip to be repeatedly used without not only complicating structure of the electrophoresis chip, but also impairing cost and operability.

BRIEF DESCRIPTION OF THE DRAWINGS

FIG. 16 is a schematic sectional view for illustrating a step of operation of cleaning the inside of a flow path as a reference example.

EMBODIMENT OF THE INVENTION

Figure 1:
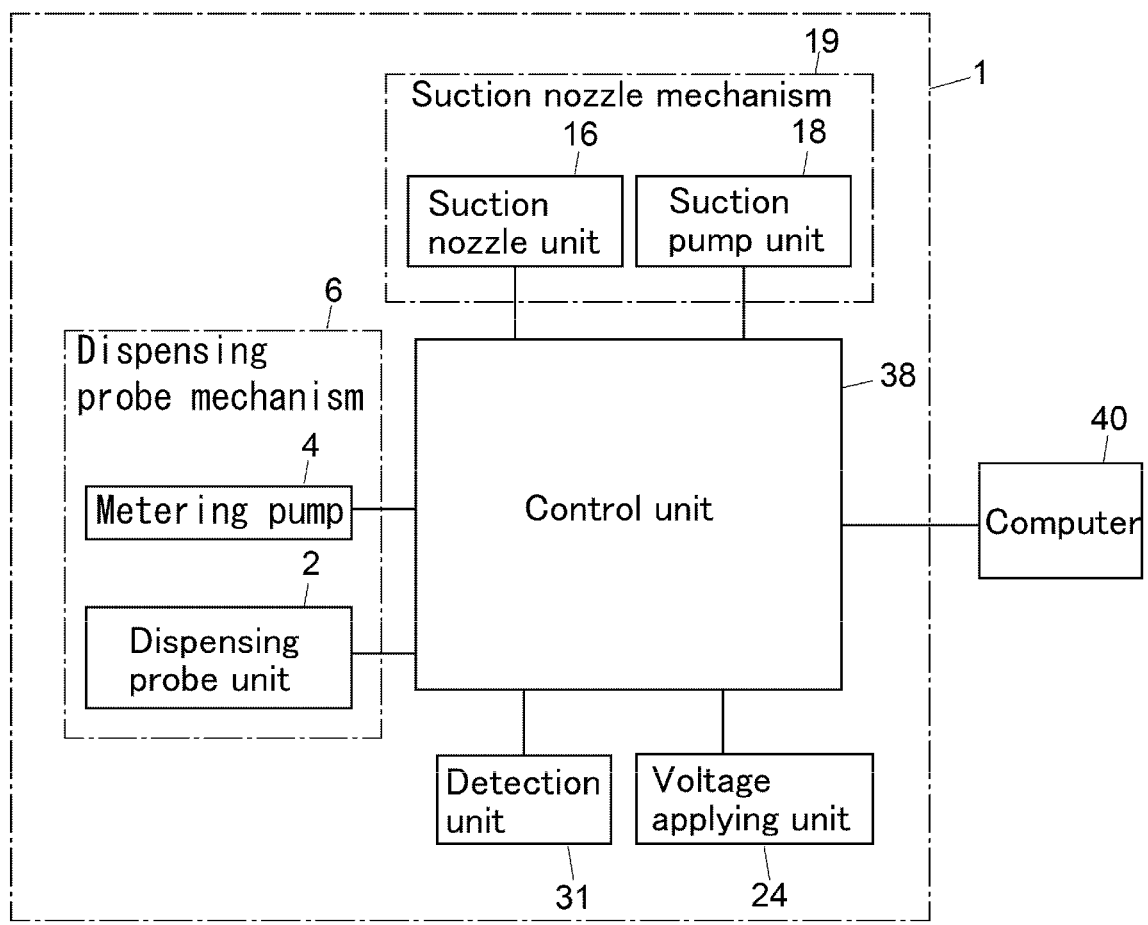
FIG. 1 is a block diagram schematically illustrating a part relating to a control unit of a microchip electrophoresis apparatus in an embodiment.

In the embodiment of the microchip electrophoresis apparatus of the present invention, for example, the through hole of the seal-attached member disposed while maintaining airtightness for the reservoir of the microchip can be used for increasing the reservoir capacity. This enables increase in the reservoir capacity without increasing cost of expendables (microchips).

When the cleaning liquid is stored in the through hole disposed while maintaining airtightness for the reservoir, the suction nozzle can be cleaned in the through hole. In this case, a special container for cleaning the suction nozzle is unnecessary to enable the apparatus configuration to be simplified.

In addition, the seal-attached member having an elastic member that is pressed against the microchip so as to maintain airtightness between the through hole and the reservoir achieves an effect of increasing a creepage distance between the reservoirs. Thus, this enables preventing a short circuit between reservoir electrodes without increasing cost of expendables (microchips).

In addition, in the embodiment of the microchip electrophoresis apparatus of the present invention, for example, the control unit may control operation of the dispensing probe mechanism to clean the inside of each of the flow paths of the microchip in such a way that the dispensing probe is inserted into a pressurizing port through hole being a predetermined one of the through holes, while airtightness between the pressurizing port through hole and the dispensing probe is maintained, and in such a way that the dispensing probe discharges the cleaning liquid to cause the cleaning liquid to flow from a pressurizing port reservoir being the reservoir under the pressurizing port through hole into the flow paths. This enables cleaning while allowing an excessive amount of the cleaning liquid to continuously flow to the flow paths and the reservoirs, so that cleaning time can be shorten.

In the embodiment of the microchip electrophoresis apparatus of the present invention, for example, the dispensing probe may have a probe tapered portion with an outer diameter decreasing toward its leading end, so that the probe tapered portion is pressed against an inner wall of the pressurizing port through hole to maintain airtightness between the pressurizing port through hole and the dispensing probe. This enables airtightness between the pressurizing port through hole and the dispensing probe to be secured without using a seal-attached member such as an O ring.

In addition, for example, the pressurizing port through hole may have a through hole tapered portion with an inner diameter decreasing toward the chip holding unit, so that the dispensing probe is pressed against the through hole tapered portion to maintain airtightness between the pressurizing port through hole and the dispensing probe. This enables airtightness between the pressurizing port through hole and the dispensing probe to be more reliably secured.

In addition, in the embodiment of the microchip electrophoresis apparatus of the present invention, for example, the pressurizing port through hole have a portion to be pressed by the dispensing probe, and the portion may be formed of a through hole member exchangeable for a base material of the seal-attached member. As a result, when the portion of the pressurizing port through hole, pressed by the dispensing probe, is deteriorated due to abrasion or the like, the through hole member including the portion is exchanged to enable airtightness between the pressurizing port through hole and the dispensing probe to be secured.

In addition, when the inside of each of the flow paths is cleaned, the control unit may control operation of the dispensing probe mechanism and the suction nozzle mechanism in such a way that a liquid surface of the cleaning liquid discharged from the flow paths to the reservoirs other than the pressurizing port reservoir is positioned in the through holes other than the pressurizing through hole, for example. This enables the suction nozzle to be cleaned in the reservoir.

In addition, the control unit may, for example, control operation of the dispensing probe mechanism and the suction nozzle mechanism in such a way that: the dispensing probe is pulled out from the pressurizing port through hole after the cleaning liquid is supplied from the dispensing probe and the inside of each of the flow paths is cleaned; the suction nozzle is inserted into the pressurizing port reservoir through the pressurizing port through hole to suck and remove the cleaning liquid in the pressurizing port reservoir; the suction nozzle is pulled out from the pressurizing port through hole; the dispensing probe is inserted again into the pressurizing port through hole while airtightness is maintained; the dispensing probe discharges air such that the air flows from the pressurizing port reservoir into the flow paths; and the suction nozzle sucks the cleaning liquid discharged into the remaining reservoir from the flow paths.

Hereinafter, an embodiment of a microchip electrophoresis apparatus will be described with reference to the drawings.

Figure 2:
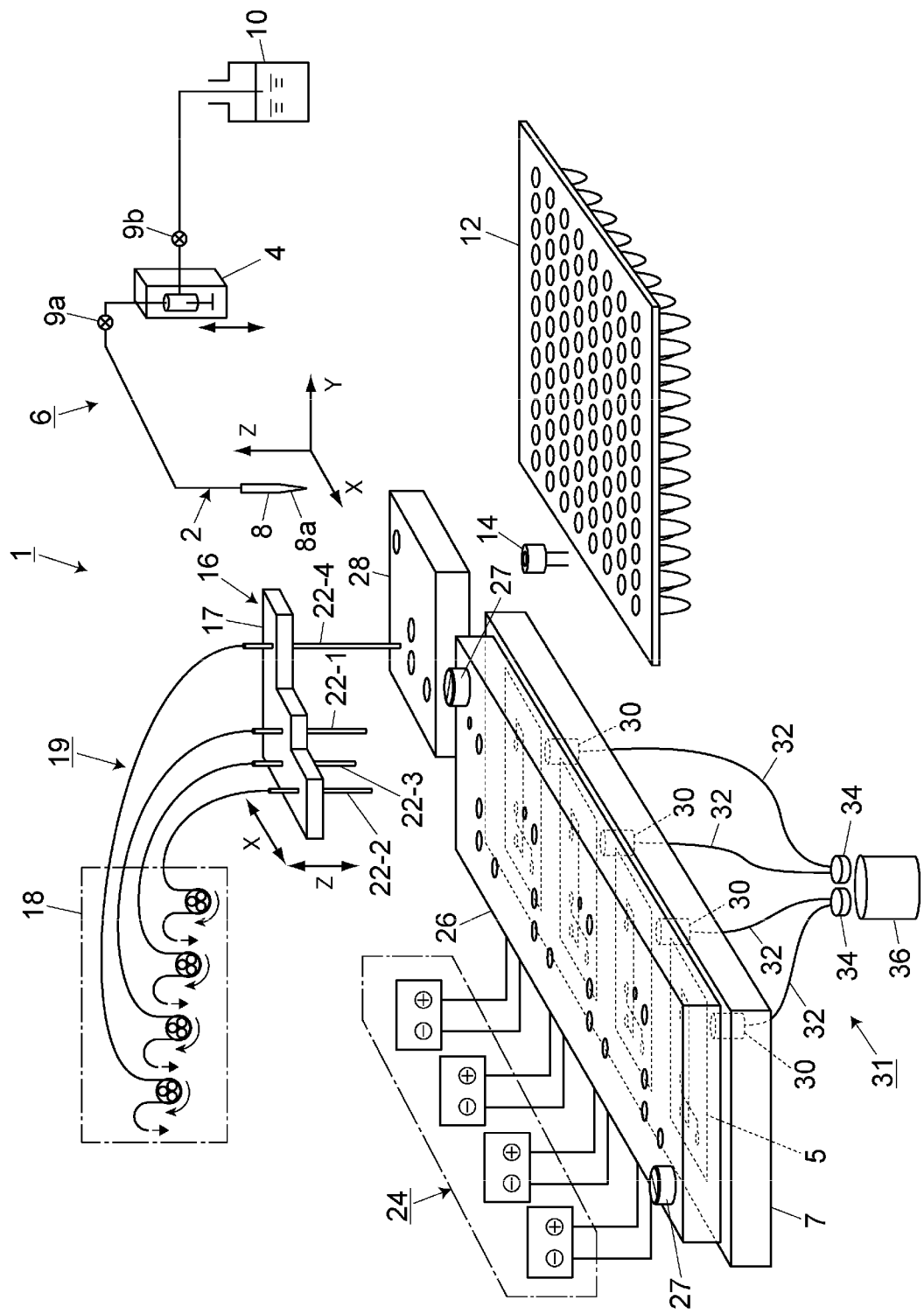
FIG. 2 is a schematic perspective view for illustrating a configuration of the embodiment.

FIG. 1 is a block diagram schematically illustrating a part relating to a control unit of a microchip electrophoresis apparatus in an embodiment. FIG. 2 is a schematic perspective view for illustrating a configuration of the microchip electrophoresis apparatus of the embodiment.

A microchip electrophoresis apparatus 1 roughly includes a dispensing probe mechanism 6 having a dispensing probe unit 2 and a metering pump 4, a chip holding unit 7, a suction nozzle mechanism 19 having a suction nozzle unit 16 and a suction pump unit 18, a voltage applying unit 24, a seal-attached member 26, a detection unit 31, and a control unit 38.

The chip holding unit 7 holds, for example, four electrophoretic chips 5. The seal-attached member 26 is disposed facing the electrophoresis chips 5. The seal-attached member 26 is detachably attached to the chip holding unit 7 with screws 27. The electrophoresis chip 5, the chip holding unit 7, and the seal-attached member 26 will be described below.

The dispensing probe mechanism 6 is configured to not only dispense a separation polymer or a sample but also supply a cleaning liquid and air, to a reservoir of the electrophoresis chip 5. The dispensing probe unit 2 of the dispensing probe mechanism 6 includes a dispensing probe 8, and a dispensing probe moving mechanism for three-dimensionally moving the dispensing probe 8 in a horizontal direction (XY direction) and a vertical direction (Z direction). The dispensing probe 8 is made of stainless steel, for example, and has a probe tapered portion 8a with an outside diameter decreasing toward its leading end.

The dispensing probe mechanism 6, for example, also includes the metering pump 4, on-off valves 9a and 9b, and a cleaning liquid container 10. The dispensing probe 8 is connected to the metering pump 4 via the on-off valve 9a. The cleaning liquid container 10 is connected to the metering pump 4 via the on-off valve 9b. The cleaning liquid container 10 contains the cleaning liquid. The cleaning liquid is, for example, pure water.

The suction nozzle mechanism 19 is configured to suck the separation polymer, the sample, or the cleaning liquid in the reservoir of the electrophoresis chip 5. The suction nozzle portion 16 of the suction nozzle mechanism 19 includes suction nozzles 22-1 to 22-4 provided corresponding to reservoirs of one of the electrophoresis chips 5, a nozzle holder 17 holding the suction nozzles 22-1 to 22-4, and a suction nozzle moving mechanism for moving the nozzle holder 17, for example, two-dimensionally in the X direction and the Z direction. The suction nozzle moving mechanism may be configured to move the suction nozzles three-dimensionally. The suction nozzles 22-1 to 22-4 are connected to respective pumps provided in the suction pump unit 18. The suction nozzles 22-1 to 22-4 are each made of, for example, stainless steel.

The dispensing probe moving mechanism and the suction nozzle moving mechanism are each formed of a linear movement guide mechanism such as a belt driving method or a ball screw driving method operated by rotation of a motor. However, these moving mechanisms are not limited to the linear motion guide mechanism, and are not particularly limited as long as they each have a function capable of moving the dispensing probe and the suction nozzle to a predetermined position.

A probe cleaning section 14 for cleaning the dispensing probe 8 and a nozzle cleaning section 28 for cleaning the suction nozzles 22-1 to 22-4 are provided. The cleaning liquid is supplied to the probe cleaning section 14 and the nozzle cleaning section 28.

Within a moving range of the dispensing probe 8 a well plate 12 with 96 holes containing a sample, a reagent, a separation polymer, and the like is disposed. The reagent and the separation polymer may be disposed near the well plate 12 while being each contained in a special container.

The voltage applying unit 24 applies an independent electrophoresis voltage to each flow path end of the corresponding one of the electrophoresis chips 5.

The detection unit 31 detects, for example, fluorescence of a sample component separated in the separation flow path in the electrophoresis chip 5. The detection unit 31 includes a light emitting diode (LED) 30 that irradiates a part of the separation flow path with excitation light, and an optical fiber 32 for receiving fluorescence generated by a sample component moving in the separation flow path when the sample component is excited by the excitation light from the LED 30, for each of the electrophoresis chips 5, for example. The detection unit 31 also includes a photomultiplier tube 36 that receives fluorescence through a filter 34 that removes an excitation light component from the fluorescence from the optical fiber 32 to transmit only a fluorescence component.

In the present embodiment, two filters 34, each of which transmits different fluorescent light, are used. This enables different kinds of fluorescence to be detected in the respective four electrophoresis chips 5. However, when the same fluorescence is detected in the four electrophoresis chips 5, one filter can be mutually used.

Causing each of the four LEDs 30 to emit light at a different time enables one photomultiplier tube 36 to identify and detect fluorescence from the four electrophoresis chips 5. A light source of the excitation light is not limited to the LED, and may be, for example, a laser diode (LD).

The control unit 38 controls operations of the dispensing probe mechanism. 6, the suction nozzle mechanism. 19, the voltage applying unit 24, and the detection unit 31. The control unit 38 is composed of, for example, a microcomputer equipped with a central processing unit (CPU), a storage device, and the like. The control unit 38 is connected to a computer 40 provided outside the microchip electrophoresis apparatus 1.

The computer 40 is composed of, for example, a personal computer (PC) or a dedicated computer. The computer 40 is an external control device for instructing operation of the microchip electrophoresis apparatus 1, and capturing and processing data obtained by the detection section 31.

Figure 3:
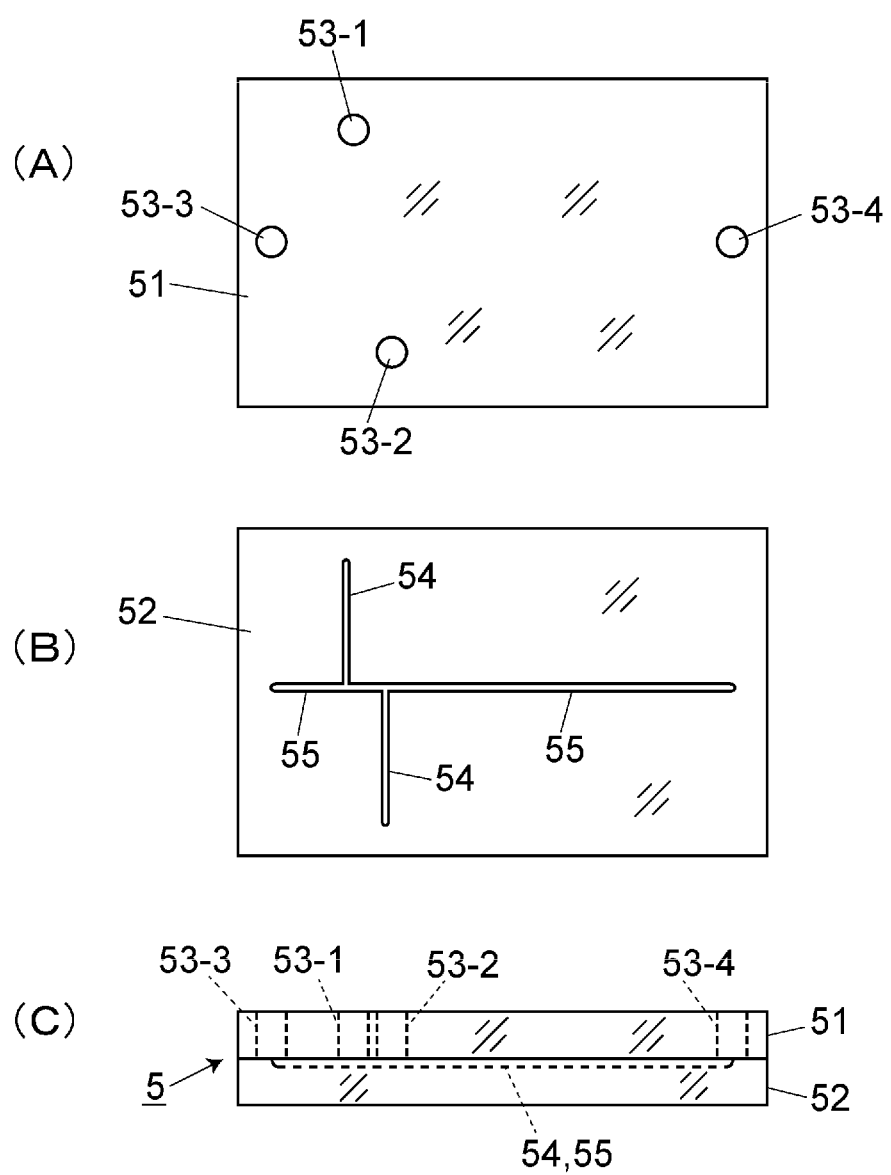
FIG. 3 shows views (A) to (C), each illustrating an example of a microchip. Views (A) and (B) are plan views each illustrating a transparent plate member constituting the microchip, and view (C) is a front view of the microchip.
Figure 4:
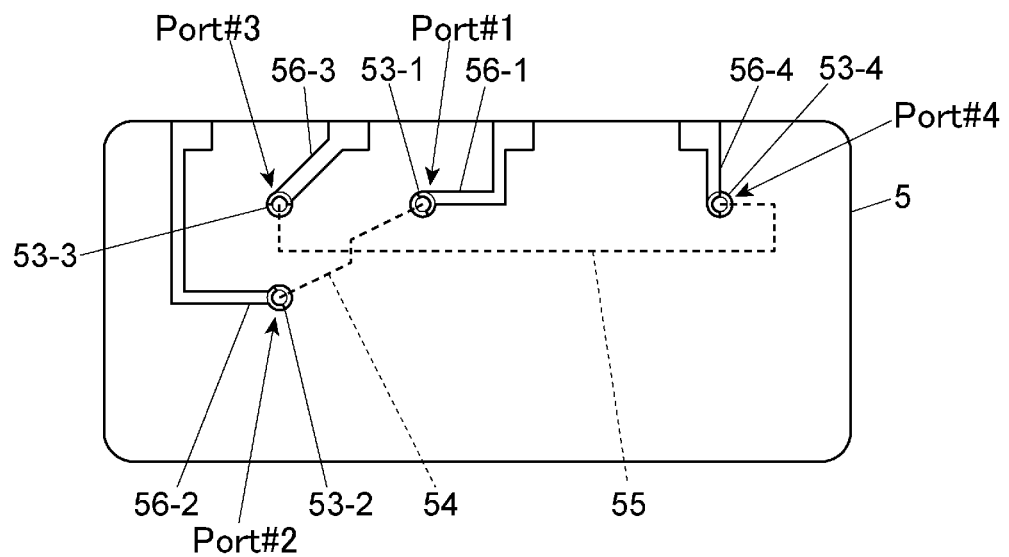
FIG. 4 is a plan view illustrating a specific example of the microchip.

Views (A) to (C) of FIG. 3 and FIG. 4 each illustrate an example of the electrophoresis chip 5. The electrophoresis chip (microchip) in the embodiment of the present invention refers to a chip provided in its inside with a flow path having a reservoir opened at its end, and is not necessarily limited to a chip with a small size.

As illustrated in views (A) to (C) of FIG. 3, the electrophoresis chip 5 is composed of, for example, a pair of transparent substrates 51 and 52, for example. The transparent substrates 51 and 52 are each formed of, for example, a glass substrate made of quartz glass or the like, or a resin substrate.

The one substrate 52 is provided in its surface with electrophoretic capillary grooves 54 and 55 intersecting each other as illustrated in view (B) of FIG. 3. The other substrate 51 is provided with through holes as reservoirs 53-1 to 53-4 at positions corresponding to the corresponding ends of the grooves 54 and 55, as illustrated in view (A) of FIG. 3. As illustrated in view (C) of FIG. 3, the two substrates 51 and are stacked and bonded to each other to form the electrophoresis chip 5. The capillary grooves 54 and 55 form a separation flow path 55 for electrophoretic separation of a sample and a sample introduction flow path 54 for introducing a sample into the separation flow path 55, respectively, in the electrophoresis chip 5.

While the electrophoresis chip 5 is basically illustrated in views (A) to (C) of FIG. 3, a chip on which an electrode terminal for applying a voltage is previously formed as illustrated in FIG. 4 is used to facilitate handling. FIG. 4 is a plan view of the electrophoresis chip 5.

The four reservoirs 53-1 to 53-4 are also ports for applying a voltage to the corresponding flow paths 54 and 55. Ports #1 and #2 are positioned at respective opposite ends of the sample introduction flow path 54. Ports #3 and #4 are positioned at respective opposite ends of the separation flow path 55. The port #4 constitutes a pressurizing port. The reservoir 53-4 constitutes a pressurizing port reservoir.

To apply a voltage to each of the ports, electrode patterns 56-1 to 56-4 are respectively formed from inner wall surfaces of the reservoirs 53-1 to 53-4 constituting the respective ports to a surface of the electrophoresis chip 5. The electrode patterns 56-1 to 56-4 are configured to be connected to the voltage applying unit 24 (refer to FIG. 2).

Figure 5:
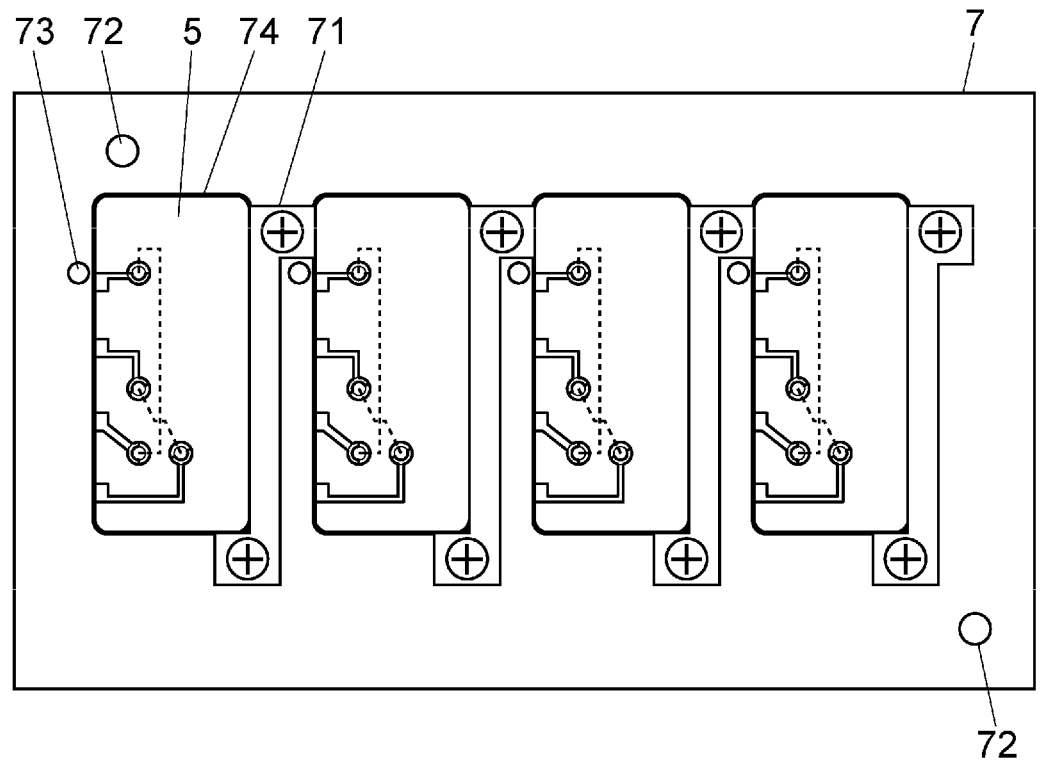
FIG. 5 is a schematic plan view illustrating a chip holding unit with electrophoresis chips mounted.
Figure 6:
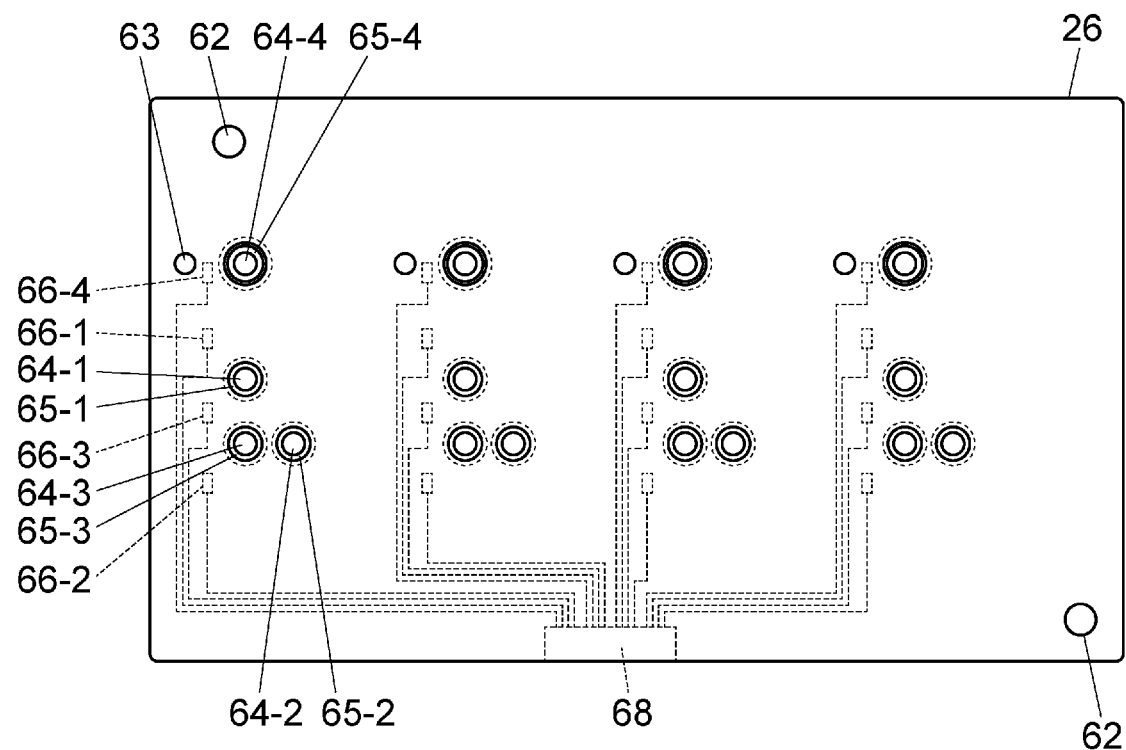
FIG. 6 is a schematic plan view illustrating a seal-attached member.
Figure 7:
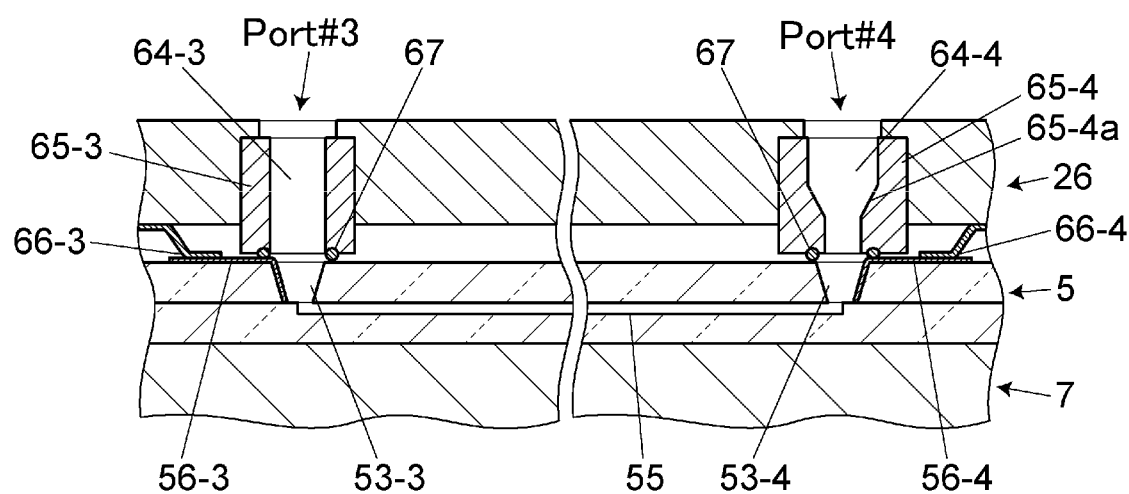
FIG. 7 is a schematic sectional view illustrating a part of a chip holding unit with a microchip and a seal-attached member attached.

With reference to FIGS. 5 to 7, the seal-attached member and the chip holding unit will be described. FIG. 5 is a schematic plan view illustrating the chip holding unit with an electrophoresis chip mounted. FIG. 6 is a schematic plan view illustrating the seal-attached member. FIG. 7 is a schematic sectional view illustrating a part of the chip holding unit with the electrophoresis chip and the seal-attached member attached. While FIG. 7 illustrates the ports #3 and #4 without illustrating the ports #1 and #2, the ports #1 and #2 are each similar to the port #3 in structure.

As illustrated in FIG. 5, the chip holding unit 7 is provided with chip holders 71 and recessed portions 74 for holding the electrophoresis chips 5 at respective four positions in its top surface. The chip holding unit 7 is also provided at its two diagonal positions with respective screw holes 72 for fixing the seal-attached member 26. As illustrated in FIG. 6, the seal-attached member 26 is also provided at its two diagonal positions with respective holes 62 each for allowing the screw 27 to pass therethrough.

In addition, the chip holding unit 7 is provided with escape holes 73 each for inserting the suction nozzle 22-4 described below thereinto. The escape holes 73 are each provided at a position displaced in the X direction (refer to FIG. 2) from a holding position of the corresponding one of the electrophoresis chips 5.

The seal-attached member 26 is made of, for example, resin, and is provided with through holes 64-1 to 64-4 at positions corresponding to the reservoirs 53-1 to 53-4, respectively. The through hole 64-4 constitutes a pressurizing port through hole. In addition, the seal-attached member 26 is provided at a position corresponding to the escape hole 73 of the chip holding unit 7 with an escape hole 63 formed of a through hole into which the suction nozzle 22-4 described below is inserted.

The through holes 64-1 to 64-4, for example, each include a portion formed of a through hole extending from a bottom of each of bottomed cylindrical shaped holes each of which is formed in a base material of the seal-attached member 26 while having an opening in a back surface of the seal-attached member (chip holding unit 7 side), to a front surface of the seal-attached member 26, and a through hole provided in each of the through hole members 65-1 to 65-4 each fitted into the corresponding one of the bottomed cylindrical holes from the back surface of the seal-attached member 26 so as to be replaceable.

The through hole members 65-1 to 65-3 are each formed of a circular pipe member made of a resin, having, for example, a uniform inner diameter. The inner diameter of each of the through hole members 65-1 to 65-3 is set larger than an outer diameter of the dispensing probe 8 in such a way that a clearance is formed between each of the through hole members 65-1 to 65-3 and the dispensing probe 8 when the dispensing probe 8 is inserted thereinto. The through hole members 65-1 to 65-3 each have an inner diameter larger than an outside diameter of the corresponding one of the suction nozzles 22-1 to 22-3.

The through hole of the through hole member 65-4 disposed in the pressurizing port through hole 64-4 is, for example, provided in its inner wall with a through hole tapered portion 65-4a with an inner diameter decreasing toward the chip holding unit 7. The through hole taper portion 65-4a has an end portion on the chip holding unit 7 side, having an inner diameter smaller than the outer diameter of the dispensing probe 8, and is a portion against which the probe tapered portion 8a of the dispensing probe 8 is pressed. The through hole member 65-4 has an inner diameter larger than an outer diameter of the suction nozzle 22-4.

The seal-attached member 26 is provided with elastic members 67 that are pressed against the electrophoresis chip 5 so as to maintain airtightness between the through holes 64-1 to 64-4 and the corresponding reservoirs 53-1 to 53-4, and that are provided for the respective through holes 64-1 to 64-4. The elastic members 67 are each, for example, an O ring. The elastic members 67 are each disposed on a surface of the corresponding one of the through hole members 65-1 to 65-4, the surface facing the electrophoresis chip 5.

When the elastic members 67 maintain airtightness between the through holes 64-1 to 64-4 and the corresponding reservoirs 53-1 to 53-4, the through holes 64-1 to 64-4 each can be used as a reservoir with large-capacity, as needed.

The seal-attached member 26 is provided on its back surface with electrode contacts 66-1 to 66-4 that are electrically connected to the electrode patterns 56-1 to 56-4 of the electrophoresis chip 5, respectively. The electrode contacts 66-1 to 66-4 are connected to a terminal connecting part 68 with electric wiring. The terminal connecting part 68 is connected to the voltage applying unit 24 (refer to FIG. 2).

Operation of the microchip electrophoresis apparatus 1 will be described with reference to views (A) to (T) shown in FIGS. 8-12. The microchip electrophoresis apparatus 1 is configured in such a way that the electrophoresis chip 5 is repeatedly used while being fixed to the chip holding unit 7 without being moved. The operation to be described here is a series of steps of: cleaning the electrophoresis chip used in the previous analysis; filling the flow path and each of the reservoirs with the separation polymer; and then dispensing the sample to perform electrophoresis for analysis. The operation described above is performed under control by the control unit 38 of the microchip electrophoresis apparatus 1. In views (A) to (T) shown in FIGS. 8-12, illustration of the seal-attached member 26 is eliminated. Views (A) to (T) shown in FIGS. 8-12 correspond to steps (A) to (T) described below, respectively.

Figure 8:
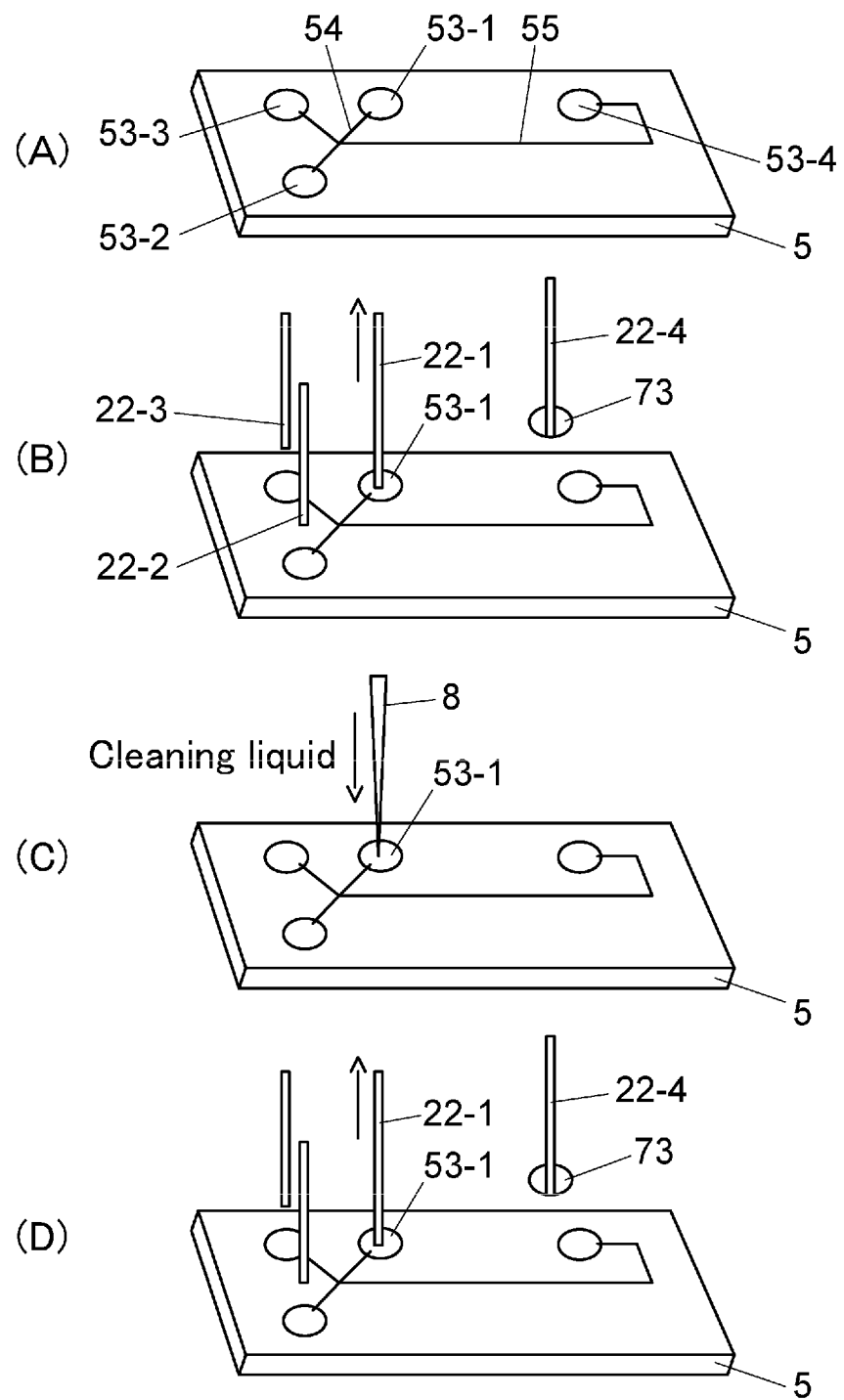
FIG. 8 shows schematic perspective views (A) to (D) illustrating operation of the embodiment in the order of steps.
Figure 9:
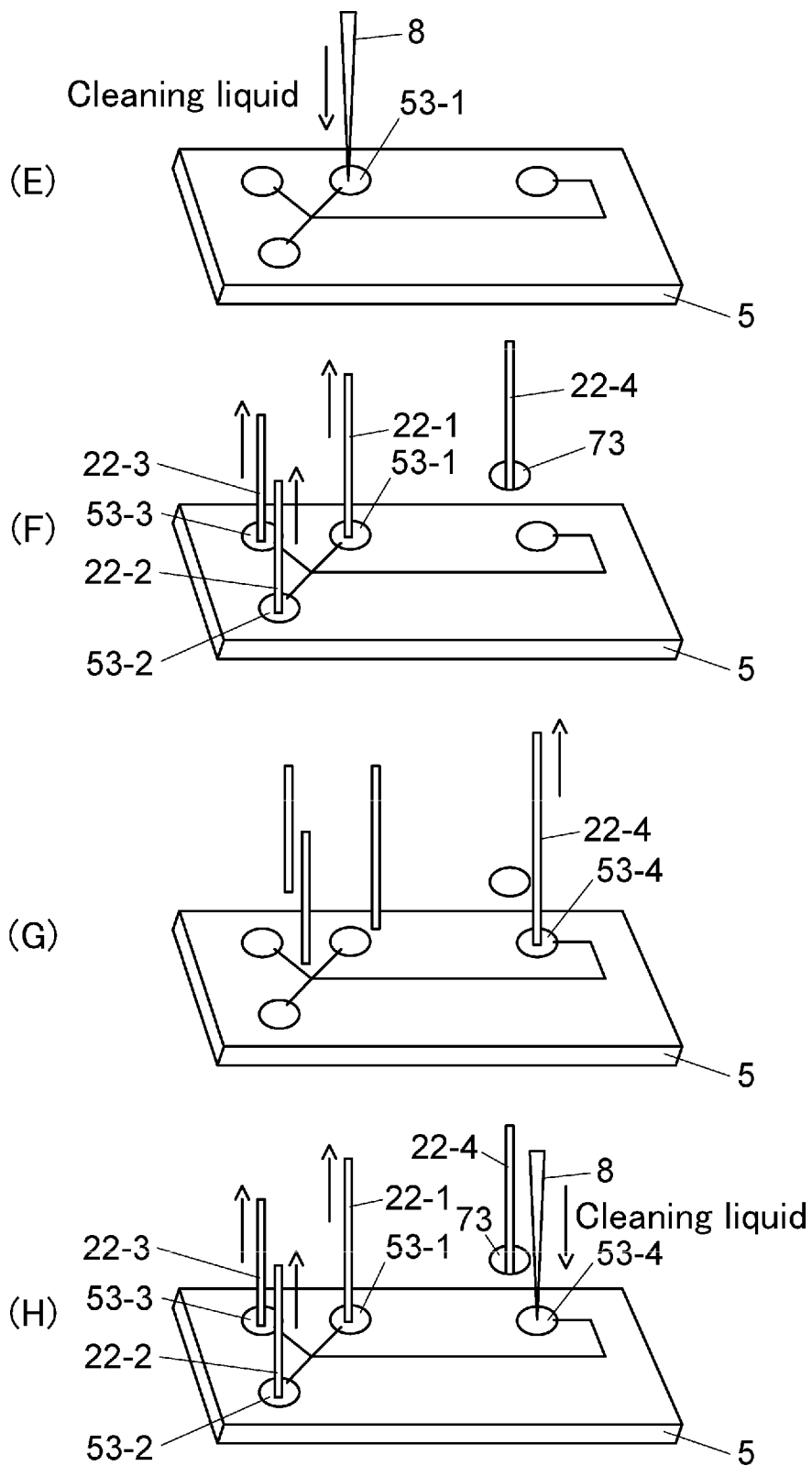
FIG. 9 shows schematic perspective views (E) to (H) for illustrating subsequent operation of the embodiment in the order of steps.
Figure 10:
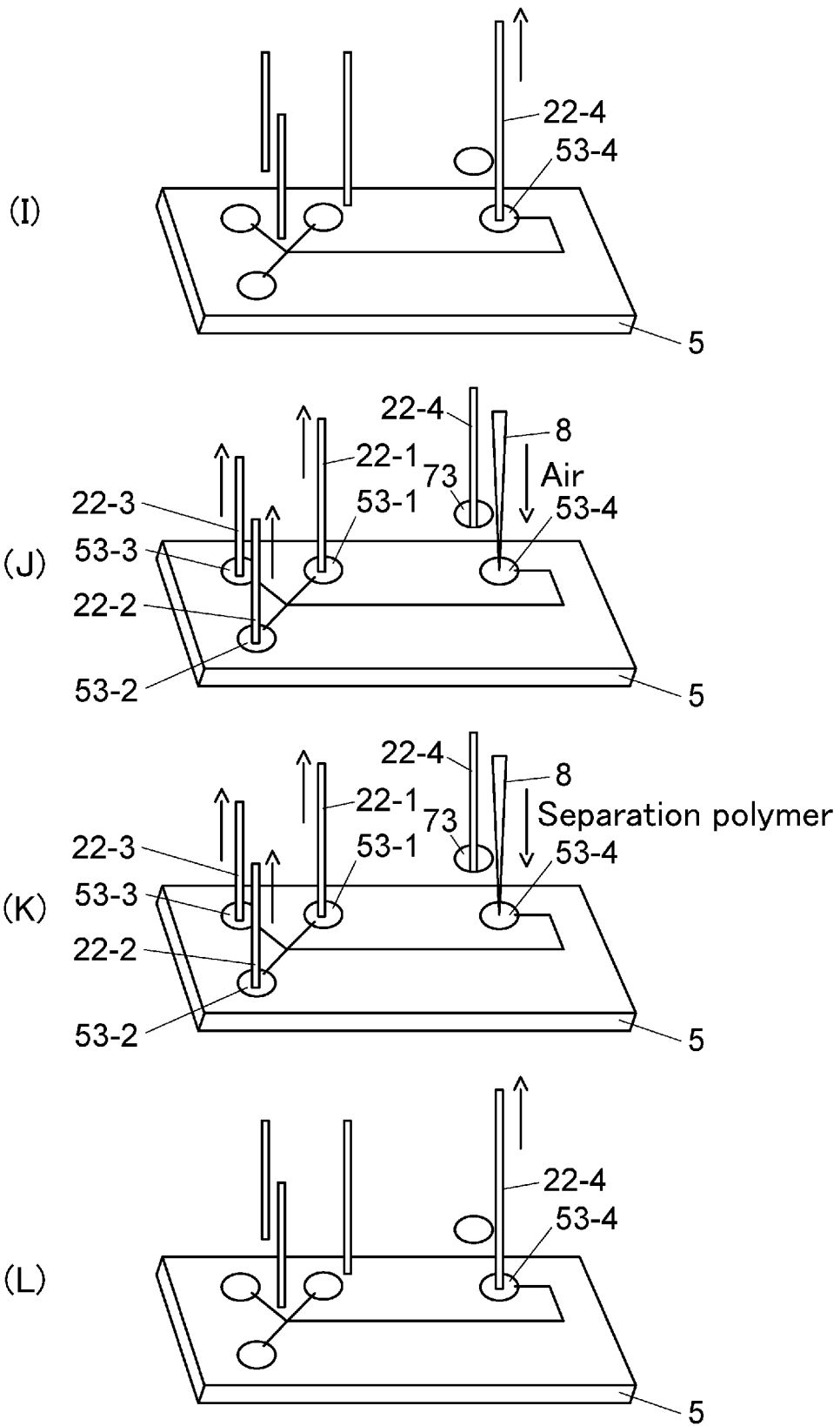
FIG. 10 shows schematic perspective views (I) to (L) for illustrating further subsequent operation of the embodiment in the order of steps.
Figure 11:
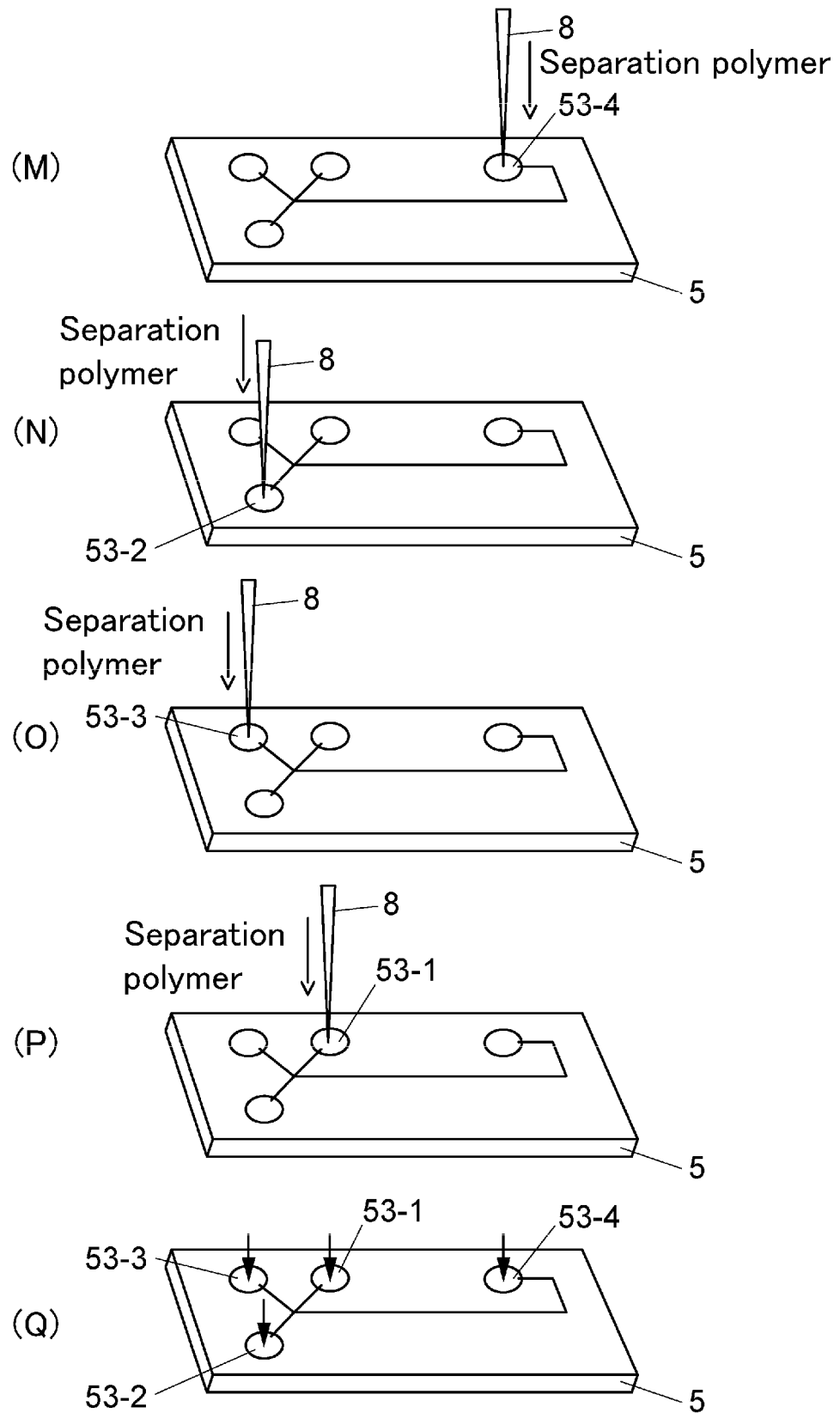
FIG. 11 shows schematic perspective views (M) to (Q) for illustrating still further subsequent operation of the embodiment in the order of steps.
Figure 12:
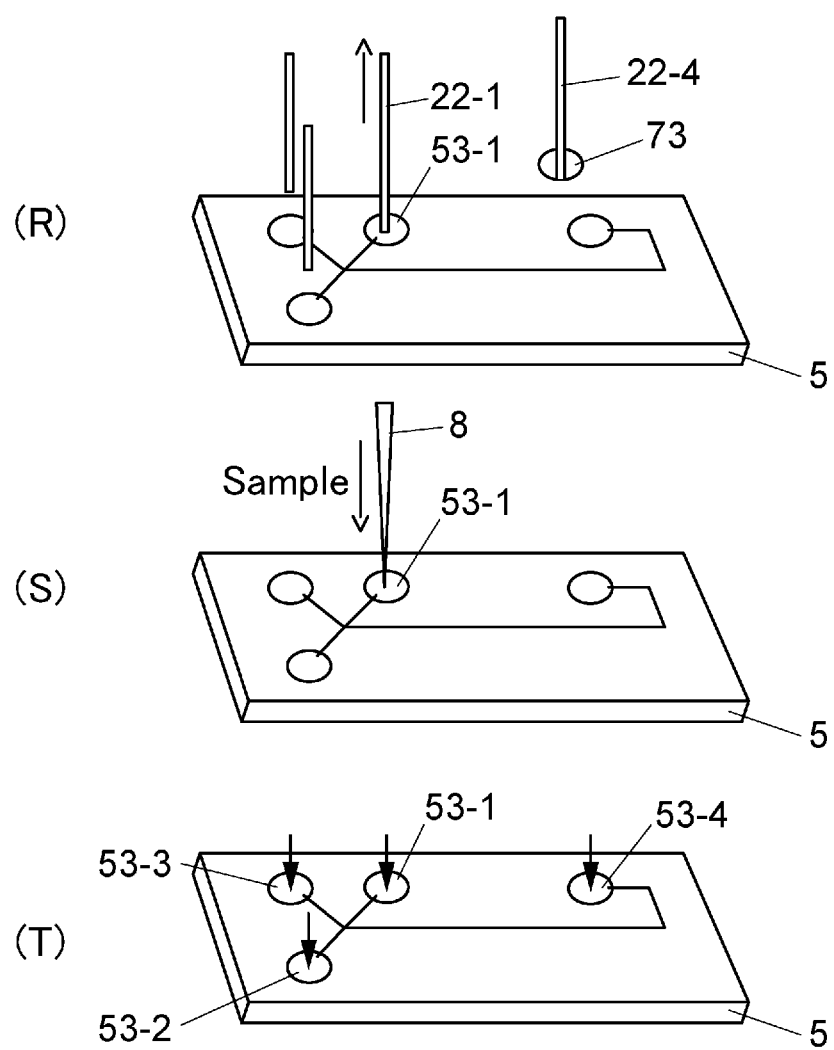
FIG. 12 shows schematic perspective views (R) to (T) for illustrating still further subsequent operation of the embodiment in the order of steps.

FIG. 8 at view (A) illustrates one electrophoresis chip 5. The electrophoresis chip 5 is equivalent to that illustrated in each of views (A) to (C) of FIG. 3 and FIG. 4. The separation flow path 55 and the sample introduction flow path 54 are provided so as to intersect each other, and the reservoirs 53-1 to 53-4 are formed at the respective ends of the corresponding flow paths 54 and 55. Here, the electrophoresis chip 5 is in a state where analysis of the previous sample is completed, and the separation polymer and a sample solution remain in the flow paths and each of the reservoirs. In addition, the separated sample remains in the separation polymer in the flow path 55.

Step (B): First, to remove the sample solution stored in the reservoir 53-1 for accommodating a sample, the nozzle holder 17 is moved to above the electrophoresis chip 5 and then lowered. The suction nozzle 22-1 is then inserted into the reservoir 53-1 through the through hole 64-1 (refer to FIG. 6).

Here, the suction nozzle 22-1 has a length longer than that of each of the suction nozzles 22-2 and 22-3, as illustrated in FIG. 2. In addition, the suction nozzle 22-4 has a length longer than that of the suction nozzle 22-1. In addition, the suction nozzles 22-1 to 22-4 are held by the nozzle holder 17 such that when the suction nozzles 22-1 to 22-3 are disposed above the reservoirs 53-1 to 53-3 (the through holes 64-1 to 64-3), respectively, the suction nozzle 22-4 is disposed above the escape holes 63 and 73 (refer to also FIGS. 5 and 6). In addition, the suction nozzles 22-1 to 22-4 are held by the nozzle holder 17 in such a way that a spring mechanism can move the suction nozzles 22-1 to 22-4 from the nozzle holder 17 to position their tips on a nozzle holder 17 side.

The suction nozzles 22-1 to 22-4 configured as described above enables forming a state where the tip of the suction nozzle 22-1 is inserted into the reservoir 53-1 and is in contact a bottom of the reservoir 53-1, the suction nozzles 22-2 and 22-3 cannot be respectively inserted into the reservoirs 53-2 and 53-3, and the tip of the suction nozzle 22-4 is inserted into the escape holes 63 and 73.

When the suction pump unit 18 (refer to FIG. 2) is operated in this state, the separation polymer in the reservoir 53-1 is sucked and removed with the suction nozzle 22-1. At this time, for example, only a pump connected to the suction nozzle 22-1 is operated in the suction pump unit 18.

In this state, the tips of the respective suction nozzles 22-2 and 22-3 may be positioned inside the through holes 64- and 64-3 (refer to FIG. 6), respectively, or disposed above the through holes 64- and 64-3, respectively.

The tip of the suction nozzle 22-4 inserted into the escape hole 73 may be brought into contact with a bottom of the escape hole 73, or may not be brought into contact therewith. However, in consideration of contamination of the tip of the suction nozzle 22-4, it is preferable that the tip of the suction nozzle 22-4 is not brought into contact with the bottom of the escape hole 73. The escape hole 73 may have a bottom, or may be a through hole.

Step (C): After the suction nozzles 22-1 to 22-4 are moved, the dispensing probe 8 is inserted into the reservoir 53-1 through the through hole 64-1 (refer to FIG. 6). At this time, a clearance is formed between the dispensing probe 8 and the through hole 64-1. Then, the cleaning liquid is supplied to the reservoir 53-1 from the dispensing probe 8. The supply of the cleaning liquid from the dispensing probe 8 will be described with reference to FIG. 2. In a state where the on-off valve 9a is closed and the on-off valve 9b is opened, the metering pump 4 is operated for suction to suck the cleaning liquid from the cleaning liquid container 10 into the metering pump 4. Then, the state is switched to that where the on-off valve 9b is closed and the on-off valve 9a is opened, the metering pump 4 is operated for discharge to supply the cleaning liquid from the dispensing probe 8.

Step (D): After the dispensing probe 8 is moved, the suction nozzle 22-1 is again inserted into the reservoir 53-1 to suck and remove the cleaning liquid.

Step (E): The dispensing probe 8 again supplies the cleaning liquid to the reservoir 53-1.

Step (F): The suction nozzles 22-1 to 22-3 are inserted into the reservoirs 53-1 to 53-3 via the through holes 64-1 to 64-3, respectively (refer to FIG. 6). The nozzle holder 17 is lowered to cause the tip of the suction nozzle 22-1 to be brought into contact with and pressed against the bottom of the reservoir 53-1. Then, the nozzle holder 17 is further lowered to cause the tips of the suction nozzles 22-2 and 22-3 to be brought into contact with the bottoms of the reservoirs 53-2 and 53-3, respectively. In addition, the suction nozzle 22-4 is inserted into the escape holes 63 and 73.

The suction pump unit 18 is operated so that the cleaning liquid in the reservoir 53-1 and the separation polymer in each of the reservoirs 53-2 and 53-3 are sucked and removed with the corresponding suction nozzles 22-1 to 22-3. At this time, for example, only pumps connected to the respective suction nozzle 22-1 to 22-3 are operated in the suction pump unit 18.

Step (G): The nozzle holder 17 is moved to insert the suction nozzle 22-4 into the pressurizing port reservoir 53-4 via the pressurizing port through hole 64-4 (refer to FIG. 6) to cause the tip of the suction nozzle 22-4 to be brought into contacts with the bottom of the pressurizing port reservoir 53-4. At this time, the suction nozzles 22-1 to 22-3 are not inserted into the reservoirs 53-1 to 53-3, respectively. The tips of the suction nozzles 22-1 to 22-3 may be positioned above the seal-attached member 26, or may be inserted into respective escape holes provided separately in the seal-attached member 26.

While the suction nozzle 22-4 is inserted into the pressurizing port reservoir 53-4, the suction pump unit 18 is operated to suck and remove the separation polymer in the reservoir 53-4 with the suction nozzle 22-4. At this time, for example, only a pump connected to the suction nozzle 22-4 is operated in the suction pump unit 18.

Figure 13:
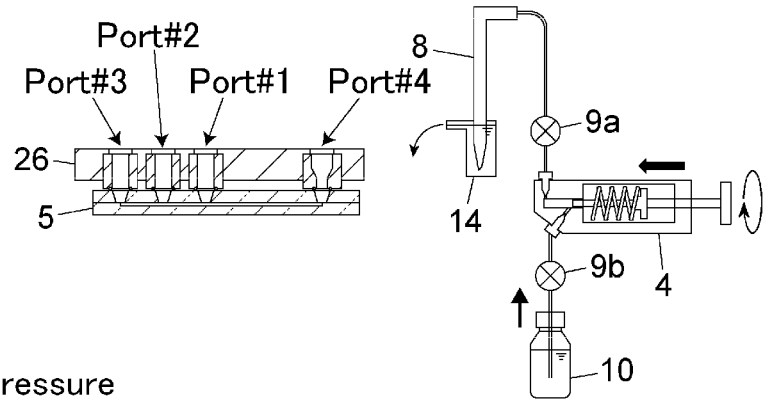
FIG. 13 shows schematic sectional views (1) to (4) for illustrating a step of operation of cleaning the inside of a flow path.
Figure 13:
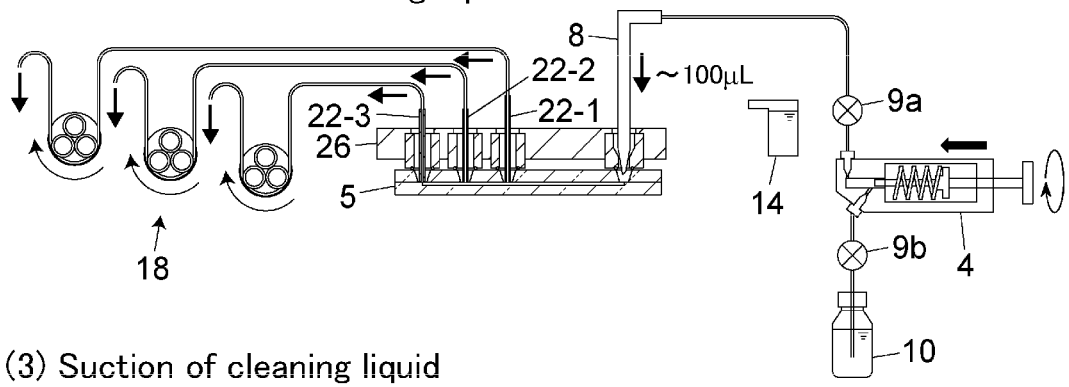
Figure 13:
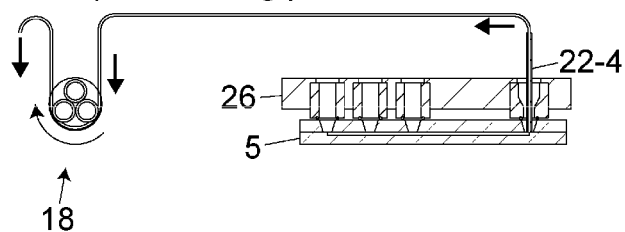
Figure 13:
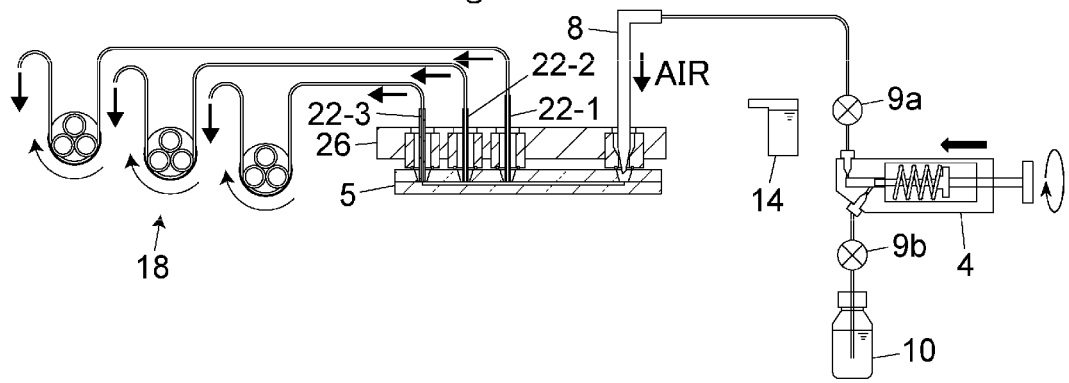
Figure 14:
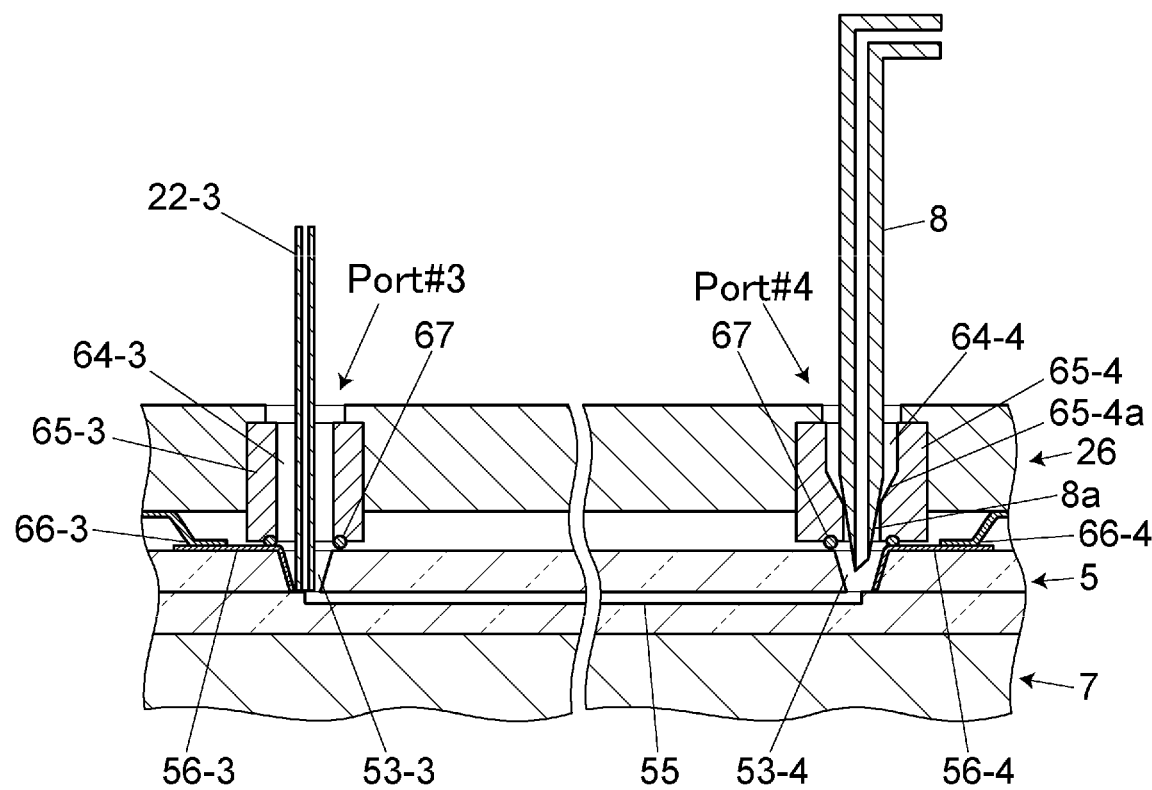
FIG. 14 is a schematic sectional view for illustrating a state where a dispensing probe is inserted into a pressurizing port #4 and a suction nozzle is inserted in a port #3.
Figure 15:
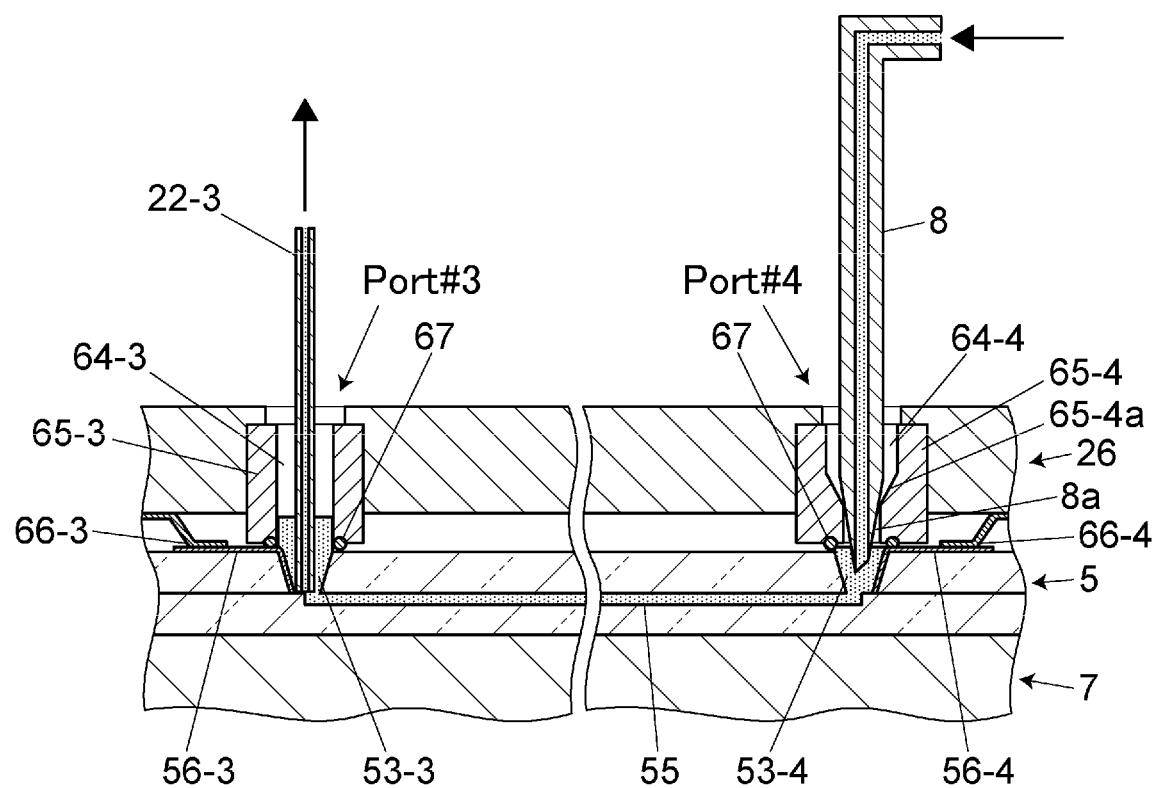
FIG. 15 is a schematic sectional view for illustrating a state where a cleaning liquid is supplied to a flow path of an electrophoresis chip.

Step (H): Next, the inside of each of the reservoirs 53-1 to 53-4 and the inside of each of the flow paths 54 and 55 are cleaned. This cleaning operation will be described with reference to views (1) to (4) of FIG. 13, FIG. 14, and FIG. 15. Views (1) to (4) of FIG. 13 are schematic sectional views for illustrating a step of operation of cleaning the inside of a flow path. FIG. 14 is a schematic sectional view for illustrating a state where the dispensing probe is inserted into the pressurizing port #4 and the suction nozzle is inserted in the port #3. FIG. 15 is a schematic sectional view for illustrating a state where the cleaning liquid is supplied to a flow path of an electrophoresis chip.

As illustrated in views (1) of FIG. 13, the dispensing probe 8 is inserted into the probe cleaning section 14 (also referred to as a rinsing port), and the cleaning liquid is supplied from the metering pump 4 to clean the dispensing probe 8. The cleaning operation of the dispensing probe 8 may be performed in parallel with the sucking operation of the separation polymer in the pressurizing port reservoir 53-4 in the above step (G).

As illustrated in view (2) of FIG. 13 and FIG. 14, the suction nozzles 22-1 to 22-3 are inserted into the reservoirs 53-1 to 53-3 through the through holes 64-1 to 64-3, respectively. In addition, the suction nozzle 22-4 is inserted into the escape holes 63 and 73.

In addition, the dispensing probe 8 is inserted into the pressurizing port reservoir 53-4 through the pressurizing port through hole 64-4. At this time, the probe tapered portion 8a of the dispensing probe 8 is pressed against the through hole tapered portion 65-4a of the pressurizing port through hole 64-4, as illustrated in FIG. 14. As a result, the airtightness between the pressurizing port through hole 64-4 and the dispensing probe 8 is maintained.

In this state, the dispensing probe 8 discharges the cleaning liquid to feed the cleaning liquid under pressure into the flow paths 54 and 55 from the pressurizing port reservoir 53-4. The separation polymer and the cleaning liquid discharged from the flow paths 54 and 55 to the reservoirs 53-1 to 53-3 are sucked by the suction nozzles 22-1 to 22-3, respectively. The amount of the cleaning liquid supplied from the dispensing probe 8 is to be sufficient for cleaning the flow paths 54 and 55, and is, for example, about 100 μL.

In addition, when the flow paths 54 and 55 are cleaned, a discharge flow rate of the cleaning liquid from the dispensing probe 8, and a suction timing and a suction amount of the cleaning liquid by each of the suction nozzles 22-1 to 22-3, are controlled in such a way that a liquid level of the cleaning liquid discharged from the flow paths 54 and 55 to the reservoirs 53-1 to 53-3 is positioned in the through holes 64-1 to 64-3 of the seal-attached member 26, as illustrated in FIG. 15. This enables cleaning outer walls of respective tip portions of the suction nozzles 22-1 to 22-3 using the cleaning liquid overflowing from the reservoirs 53-1 to 53-3 into the through holes 64-1 to 64-3, respectively.

After a sufficient amount of the cleaning liquid for cleaning in the flow paths 54 and 55 is supplied from the dispensing probe 8, the supply of the cleaning liquid from the dispensing probe 8 is stopped. Then, the cleaning liquid remaining in the reservoirs 53-1 to 53-3 is sucked and removed with the suction nozzles 22-1 to 22-3, respectively. At this time, the cleaning liquid remains in the pressurizing port reservoir 53-4 and the flow paths 54 and 55.

Step (I): The dispensing probe 8 is pulled out from the pressurizing port through hole 64-4. In addition, the suction nozzles 22-1 to 22-3 are pulled out from the through holes 64-1 to 64-3, respectively. As illustrated in view (3) of FIG. 13, the suction nozzle 22-4 is inserted into the pressurizing port reservoir 53-4 through the pressurizing port through hole 64-4. Then, the cleaning liquid remaining in the pressurizing port reservoir 53-4 is sucked and removed with the suction nozzle 22-4.

Before the dispensing probe 8 is pulled out from the pressurizing port through hole 64-4, operation of supplying the cleaning liquid to the pressurizing port reservoir 53-4 and the pressurizing port through hole 64-4 by causing the dispensing probe 8 to discharge the cleaning liquid may be performed while the dispensing probe 8 is raised to such an extent that the tip of the dispensing probe 8 does not project from the pressurizing port through hole 64-4 to form a clearance between the dispensing probe 8 and the through hole member 65-4. This enables cleaning the suction nozzle 22-4 subsequently inserted into the pressurizing port reservoir 53-4 using the cleaning liquid in the pressurizing port reservoir 53-4 and the pressurizing port through hole 64-4.

In addition, the suction nozzles 22-1 to 22-3 may be inserted into the reservoirs 53-1 to 53-3, respectively, after the cleaning liquid is discharged from the dispensing probe 8 to be fed under pressure into the flow paths 54 and 55 from the pressurizing port reservoir 53-4. In this case, the cleaning liquid overflows from the flow paths 54 and 55 into the reservoirs 53-1 to 53-3 and the through holes 64-1 to 64-3, and then accumulates. After that, when the suction nozzles 22-1 to 22-3 are inserted into the reservoirs 53-1 to 53-3 through the through holes 64-1 to 64-3, respectively, outer walls of the respective suction nozzles 22-1 to 22-3 can be cleaned. Subsequently, the cleaning liquid is sucked and removed with the suction nozzles 22-1 to 22-3. Here, the amount of the cleaning liquid supplied from the dispensing probe 8 is such that the cleaning liquid does not overflow the through holes 64-1 to 64-3. In addition, it is preferable that the amount of the cleaning liquid accumulated in the reservoirs 53-1 to 53-3 and the through holes 64-1 to 64-3 is sufficient for cleaning the outer walls of the respective suction nozzles 22-1 to 22-3.

Step (J): The suction nozzle 22-4 is pulled out from the pressurizing port through hole 64-4. As illustrated in view (4) of FIG. 13, the suction nozzles 22-1 to 22-3 are inserted into the reservoirs 53-1 to 53-3 through the through holes 64-1 to 64-3, respectively, and the suction nozzle 22-4 is inserted into the escape holes 63 and 73. In addition, the dispensing probe 8 is inserted into the pressurizing port reservoir 53-4 through the pressurizing port through hole 64-4 while airtightness is maintained. Before the dispensing probe 8 is inserted into the pressurizing port reservoir 53-4, the metering pump 4 is operated for suction to suck air into the dispensing probe 8.

The suction pump unit 18 is operated to cause the suction nozzles 22-1 to 22-3 to be ready to suck fluid. Then, the metering pump 4 is operated to supply air into the pressurizing port reservoir 53-4 from the dispensing probe 8 to push out the cleaning solution remaining in the flow paths 54 and 55 to the reservoirs 53-1 to 53-3. The cleaning liquid pushed out to the reservoirs 53-1 to 53-3 is sucked and removed with the suction nozzles 22-1 to 22-3, respectively. The amount of air supplied from the dispensing probe 8 is to be sufficient for pushing out the cleaning liquid remaining in the flow paths 54 and 55 to the reservoirs 53-1 to 53-3, and is, for example, about 100 μL. This causes the inside of the reservoirs 53-1 to 53-4 and the flow paths 54 and 55 to be empty. Then, the cleaning inside the reservoirs 53-1 to 53-4 and the flow paths 54 and 55 is completed.

Step (K): The dispensing probe 8 is pulled out from the pressurizing port through hole 64-4, and cleaning of the dispensing probe 8 and suction of the separation polymer into the dispensing probe 8 are performed. The suction nozzles 22-1 to 22-3 are inserted into the reservoirs 53-1 to 53-3, respectively, and the dispensing probe 8 is inserted into the pressurizing port reservoir 53-4 through the pressurizing port through hole 64-4 while airtightness is maintained. The suction nozzles 22-1 to 22-4 maybe cleaned by using the nozzle cleaning unit 28 before becoming a state of view (K) of FIG. 10 after the step (J) above.

The dispensing probe 8 is caused to discharge a predetermined amount of the separation polymer, so that the separation polymer is filled into the flow paths 54 and 55 from the pressurizing port reservoir 53-4. The separation polymer discharged from the flow paths 54 and 55 to the reservoirs 53-1 to 53-3 is sucked and removed with the suction nozzles 22-1 to 22-3, respectively. The amount of the separation polymer supplied from the dispensing probe 8 is to be sufficient for filling the flow paths 54 and 55, and is, for example, about 1 μL.

The separation polymer may be filled into the flow paths 54 and 55 as follows: after a predetermined amount of the separation polymer is supplied to the pressurizing port reservoir 53-4, the dispensing probe 8 is temporarily pulled out from the pressurizing port through hole 64-4; cleaning of the dispensing probe 8 and suction of air to the dispensing probe 8 are performed; the dispensing probe 8 having sucked the air is inserted again into the pressurizing port through hole 64-4 while airtightness is maintained; and a predetermined amount of air is discharged from the dispensing probe 8 to pressurize the inside of a sealed space including the pressurizing port reservoir 53-4.

Step (L): The suction nozzle 22-4 is inserted into the pressurizing port reservoir 53-4 to suck and remove the separation polymer remaining in the pressurizing port reservoir 53-4. This causes the separation polymer to remain only in the flow paths 54 and 55.

Steps (M) to (P): The dispensing probe 8 sequentially dispenses a predetermined amount of the separation polymer to the reservoirs 53-1 to 53-4. When the separation polymer is dispensed to the pressurizing port reservoir 53-4, the separation polymer is dispensed in a state where a clearance is formed between the dispensing probe 8 and the through hole member 65-4. This is because air enters the flow path 55 when the space including the pressurizing port reservoir 53-4 is sealed. In addition, the order in which the separation polymer is dispensed to the reservoirs 53-1 to 53-4 is not limited to the order of the steps (M) to (P), and is not particularly limited.

Step (Q): The voltage applying unit 24 applies a predetermined test voltage to the reservoir 53-1 to 53-4 via the electrode contacts 66-1 to 66-4 and the electrode patterns 56-1 to 56-4, respectively (refer to FIGS. 2, 4, and 6) to perform an electrophoresis test. In this electrophoresis test, for example, it is checked whether dust or air bubbles are mixed in the flow path by detecting a current value between the electrode patterns. The test voltage may be the same as the electrophoretic voltage for separating the sample, or lower than that.

When it is determined that the separation polymer is normally filled in the flow path in this electrophoresis test step, treatment proceeds to the next step (R) of injecting a sample to perform analysis of the sample. In addition, when it is not determined that the separation polymer is normally filled in the flow path, the treatment returns to the step (F) to re-fill the flow path with the separation polymer.

For example, the number of times to allow re-filling of the separation polymer into the flow paths 54 and 55 is preliminarily set. When it is not determined that the separation polymer is normally filled in the flow paths 54 and 55 even after re-filling of the separation polymer by the number of times, the electrophoresis chip 5 is removed from the chip holding unit 7 to be replaced with another electrophoresis chip 5. The number of times to allow re-filling of the separation polymer is not particularly limited, and, for example, is suitably two or three times.

Step (R): The suction nozzle 22-1 is inserted into the reservoir 53-1 for accommodating the sample to suck and remove the separation polymer in the reservoir 53-1.

Step (S): The dispensing probe 8 dispenses a predetermined amount of sample solution into the reservoir 53-1. The dispensing amount of the sample solution is set for each electrophoresis chip 5.

Step (T): The voltage applying unit 24 applies a predetermined sample introduction voltage to the reservoirs 53-1 to 53-4 via the electrode contacts 66-1 to 66-4 and the electrode patterns 56-1 to 56-4, respectively (refer to FIGS. 2, 4, and 6), so that the sample is guided to an intersection of the flow paths 54 and 55 (refer to FIG. 4). Then, the applied voltage is switched to a predetermined electrophoretic separation voltage, and the sample is guided into the separation flow path 55 toward the reservoir 53-4 to be separated in the separation flow path 55. The separated sample is detected by the detection unit 31 (refer to FIG. 2).

In the present embodiment, the microchip electrophoresis apparatus 1 is configured in such a way that the dispensing probe 8 is inserted into the pressure port through hole 64-4 while airtightness between the pressure port through hole 64-4 and the dispensing probe 8 is maintained, and in such a way that the suction nozzles 22-1 to 22-3 are inserted into the through holes 64-1 to 64-3, respectively, as described in the step (H) above. In addition, the airtightness between the pressurizing port through hole 64-4 and the pressurizing port reservoir 53-4 is maintained by the elastic member 67. As a result, the pressurizing port reservoir 53-4 and the dispensing probe 8 are connected on-line. Then, the microchip electrophoresis apparatus 1 can continuously clean the electrophoresis chip 5 in a short time by continuously supplying the cleaning liquid into the flow paths 54 and 55. In addition, each of the through holes is isolated by the elastic member, so that a risk of short circuit due to splashing, liquid leakage, or the like can be avoided.

Next, as a reference example, with reference to FIG. 16, a step of cleaning the inside of the flow paths 54 and 55 when the seal-attached member 26 is not provided is described.

First, the sample solution and the separation polymer in each of the reservoirs 53-1 to 53-4 are sucked and removed, and the cleaning liquid is dispensed into each of the reservoirs 53-1 to 53-4 and then is sucked and removed.

After that, the following steps are performed in order as illustrated in FIG. 16: (11) cleaning of the dispensing probe 8; (12) dispensing of the cleaning liquid into the pressurizing port reservoir 53-4; (13) feeding of the cleaning liquid under pressure using a pressurizing mechanism 100 (e.g., refer to Patent Document 1); (14) sucking and removing of a used separation polymer or the cleaning liquid, discharged to reservoirs 53-1 to 53-4; (15) sucking and removing of the cleaning liquid in the pressurizing port reservoir 53-4; and (16) cleaning of inner and outer surfaces of each of the suction nozzles 22-1 to 22-4.

In the step (12) above, to prevent the cleaning liquid from overflowing the pressurizing port reservoir 53-4, the amount of the cleaning liquid to be injected into the reservoir 53-4 is required to be set less than the capacity of the reservoir 53-4, and is, for example, about 3 μL. Thus, to thoroughly clean the inside of each of the flow paths 54 and 55, a series of treatments in the steps (11) to (16) needs to be repeated many times (e.g., three times or more).

In contrast, the microchip electrophoresis apparatus 1 according to the embodiment of the present invention can continuously supply the cleaning liquid online into the flow paths 54 and 55, so that the inside of not only each of the flow paths 54 and 55, but also each of the reservoirs 53-1 to 53-4, can be efficiently cleaned in a short time.

In a case without the seal-attached member 26, when the liquid is dispensed to the reservoir in which the liquid remains, or the liquid is dispensed more than the reservoir capacity, the cleaning liquid and the separation polymer overflow onto a chip surface. This requires the electrophoresis chip 5 to be removed from the apparatus 1 to clean the surface manually, so that convenience of a full automatic is impaired.

For this kind of problem, the microchip electrophoresis apparatus 1 is provided with the seal-attached member 26, so that even when the amount of liquid equal to or more than the reservoir capacity is supplied into the reservoirs 53-1 to 53-4, the liquid overflowing from the reservoirs can be contained in the corresponding through holes 64-1 to 64-4. This prevents the liquid from scattering from the reservoirs 53-1 to 53-4 and adhering to the top surface of the electrophoresis chip 5.

In addition, the capacity of each of the reservoirs 53-1 to 53-4 of the electrophoresis chip 5 is determined by a thickness of a plate member constituting the electrophoresis chip 5 and a hole diameter, and is, for example, about 2 μL to 3 µL. When electrophoresis for, for example, five minutes or more is about to be continuously performed using the reservoirs, the capacity of each of the reservoirs is insufficient. Thus, it is necessary to devise measures such as separately forming a member for increasing the reservoir capacity in the electrophoresis chip.

In contrast, the microchip electrophoresis apparatus 1 of the present embodiment is configured such that the through holes 64-1 to 64-4 of the seal-attached member 26 constitute respective spaces continuous with the corresponding reservoirs 53-1 to 53-4 to enable each of the through holes 64-1 to 64-4 to be used as a large capacity reservoir. As a result, it is unnecessary to devise measures such as separately processing the electrophoresis chip.

For example, when the plate member is increased in thickness to increase the reservoir capacity of the electrophoresis chip, or when a member for increasing the reservoir capacity is separately provided on the surface of the chip around the reservoir, manufacturing costs of the electrophoresis chip itself increases. In contrast, the microchip electrophoresis apparatus 1 can increase the reservoir capacity by using the through holes 64-1 to 64-4 without applying any design change or special processing to the electrophoresis chip 5 as a consumable (without increasing the cost of the electrophoresis chip 5). In addition, chip replacement also can be facilitated.

In addition, the microchip electrophoresis apparatus 1 also enables the suction nozzles 22-1 to 22-4 to be cleaned in the through holes 64-1 to 64-4, respectively, as described in the steps (H) and (I) above. This enables the nozzle cleaning section 28 to be eliminated from the configuration of the microchip electrophoresis apparatus 1. When the nozzle cleaning section 28 is not provided, apparatus configuration of the microchip electrophoresis apparatus 1 can be simplified.

While the embodiment of the present invention is described above, the configurations, the placements, the numerical values, the materials, and the like in the embodiment are merely examples. Thus, the present invention is not limited thereto, and can be variously modified within the scope of the present invention described in the scope of claims.

For example, while the through hole member 65-4 exchangeable for the base material of the seal-attached member 26 forms the portion against which the dispensing probe 8 is pressed in the pressurizing port through hole 64-4 in the above embodiment, the portion may be formed of the base material of the seal-attached member 26 or a member that is not assumed to be exchanged.

In addition, while the through holes 64-1 to 64-4 are formed using the exchangeable through hole members 65-1 to 65-4, respectively, in the above embodiment, the through holes 64-1 to 64-4 may be formed of the base material of the seal-attached member 26 or a member that is not assumed to be exchanged.

In addition, while the probe tapered portion 8a of the dispensing probe 8 is pressed against the through hole tapered portion 64-4a of the pressurizing port through hole 64-4 to maintain airtightness between the pressurizing-port through hole 64-4 and the dispensing probe 8, the method of maintaining the airtightness between the pressurizing port through hole 64-4 and the dispensing probe 8 is not limited thereto, and any method may be used. For example, the tip of the dispensing probe may be configured to be pressed against the through hole tapered portion 64-4a, or the probe tapered portion 8a of the dispensing probe 8 may be configured to be pressed against an upper end of an inner wall of the pressurizing-port through hole. Alternatively, an elastic member for maintaining airtightness such as an O ring may be disposed between the dispensing probe and the pressurizing port through hole.

In addition, in the above embodiment, the dispensing probe mechanism 6 and the suction nozzle mechanism 19 are intentionally operated in such a way that when the inside of each of the flow paths 54 and 55 is cleaned, the liquid surface of the cleaning liquid discharged from the flow paths 54 and 55 to the reservoirs 53-1 to 53-3 is positioned within the through holes 64-1 to 64-3, respectively. However, the inside of each of the flow paths 54 and 55 may be cleaned while the cleaning liquid is prevented from overflowing from the reservoirs 53-1 to 53-3.

In addition, the electrophoresis chip used in the microchip electrophoresis apparatus according to the embodiment of the present invention is not limited to the configuration illustrated in each of views (A) to (C) of FIG. 3 and FIG. 4, and may be provided in its inside with flow paths including at least a separation flow path for separating a sample by electrophoresis, the flow paths each being provided at its end with a reservoir opened. For example, the electrophoresis chip may be configured by eliminating the sample introduction flow path 54 and the reservoirs 54-1 and 54-2 from the electrophoresis chip 5.

DESCRIPTION OF REFERENCE SIGNS

1: Microchip electrophoresis device
5: Electrophoresis chip (microchip)
6: Dispensing probe mechanism
7: Chip holding unit
8: Dispensing probe
8a: Probe tapered portion
19: Suction nozzle mechanism
22-1 to 22-4: Suction nozzle
26: Seal-attached member
38: Control unit
54: Flow path
55: Separation flow path
53-1 to 53-3: Reservoir
53-4: Pressurizing port reservoir
64-1 to 64-3: Through hole
64-4: Pressurizing port through hole
64-4a: Through hole tapered portion
67: Elastic member
65-4: Through hole member

The invention claimed is:

1. A microchip electrophoresis apparatus, comprising:
a chip holding unit that holds a microchip, an inside of the microchip including flow paths, the flow paths including at least a separation flow path for separating a sample by electrophoresis, and reservoirs opened at respective ends of the flow paths, the reservoirs face upward;
a seal-attached member that is disposed facing the microchip held by the chip holding unit, and that has replaceable through hole members at respective positions corresponding to the reservoirs, wherein each of the replaceable through hole members have through holes fluidly communicated with the corresponding reservoirs, and elastic members pressed against the microchip for maintaining airtightness between the through holes and the reservoirs, the elastic members are attached to each of the replaceable through hole members;

a dispense probe mechanism that is provided with a dispense probe, and that moves the dispense probe and discharges fluid from the dispense probe;

a suction nozzle mechanism that is provided with a suction nozzle, and that moves the suction nozzle and allows the suction nozzle to suck fluid; and a control unit that controls operation of the dispense probe mechanism and the suction nozzle mechanism.

2. The microchip electrophoresis apparatus according to claim 1, wherein the control unit is configured to control operation of the dispensing probe mechanism to clean the inside of each of the flow paths of the microchip in such a way that the dispense probe is inserted into a pressurizing port through hole being a predetermined one of the through holes, while airtightness between the pressurizing port through hole and the dispense probe is maintained, and in such a way that the dispensing probe discharges a cleaning liquid to cause the cleaning liquid to flow from a pressurizing port reservoir being the reservoir under the pressurizing port through hole into the flow paths.

3. The microchip electrophoresis apparatus according to claim 2, wherein the dispensing probe has a probe tapered portion with an outer diameter decreasing toward its leading end, and the probe tapered portion is pressed against an inner wall of the replaceable through hole member of the pressurizing port through hole to maintain airtightness between the pressurizing port through hole and the dispensing probe.

4. The microchip electrophoresis apparatus according to claim 2, wherein the replaceable through hole member of the pressurizing port through hole has a through hole tapered portion with an inner diameter decreasing toward the chip holder, and the dispensing probe is pressed against the through hole tapered portion to maintain airtightness between the pressurizing port through hole and the dispensing probe.

5. The microchip electrophoresis apparatus according to claim 2, wherein the replaceable through hole member of the pressurizing port through hole has a portion to be pressed by the dispensing probe, the replaceable through hole member being exchangeable for a base material of the seal-attached member.

6. The microchip electrophoresis apparatus according to claim 2, wherein when the inside of each of the flow paths is cleaned, the control unit is configured to control operation of the dispensing probe mechanism and the suction nozzle mechanism in such a way that a liquid surface of the cleaning liquid discharged from the flow paths to the reservoirs other than the pressurizing port reservoir is positioned in the through holes other than the pressurizing through hole.

7. The microchip electrophoresis apparatus according to claim 2, wherein the control unit is configured to control operation of the dispensing probe mechanism and the suction nozzle mechanism as follows:

the dispensing probe is pulled out from the pressurizing port through hole after the cleaning liquid is supplied from the dispensing probe and the inside of each of the flow path is cleaned;

the suction nozzle is inserted into the pressurizing port reservoir through the pressurizing port through hole to suck and remove the cleaning liquid in the pressurizing port reservoir;

the suction nozzle is pulled out from the pressurizing port through hole; the dispensing probe is inserted again into the pressurizing port through hole while airtightness is maintained;

the dispensing probe discharges air in such a way that the air flows from the pressurizing port reservoir into to the flow paths; and the suction nozzle sucks the cleaning liquid discharged into the remaining reservoir from the flow paths.

* * * * *